(12) United States Patent
Rebers et al.

(10) Patent No.: US 6,174,118 B1
(45) Date of Patent: Jan. 16, 2001

(54) MOVABLE RETENTION DEVICE FOR A THREADED FASTENER

(75) Inventors: Kenneth D. Rebers, Austin; Franklin S. Sanders, Jr., Buda; George J. Knox, Austin; Lazlo Markos, Round Rock, all of TX (US)

(73) Assignee: 3M Innovative Properties, St. Paul, MN (US)

( * ) Notice: Under 35 U.S.C. 154(b), the term of this patent shall be extended for 0 days.

(21) Appl. No.: 09/378,012

(22) Filed: Aug. 19, 1999

Related U.S. Application Data
(60) Provisional application No. 60/099,240, filed on Sep. 4, 1998.

(51) Int. Cl.[7] .................................................. F16B 39/00
(52) U.S. Cl. ............................ 411/352; 411/107; 411/999
(58) Field of Search ...................... 411/999, 970, 411/508, 913, 352, 353, 182, 526, 527, 107

(56) References Cited

U.S. PATENT DOCUMENTS

| | | |
|---|---|---|
| 2,244,976 * 6/1941 | Tinnerman . |
| 3,126,935 * 3/1964 | Tuozzo . |
| 4,133,245 * 1/1979 | Ruihley . |
| 4,143,696 * 3/1979 | Holton . |
| 4,732,519 * 3/1988 | Wagner . |
| 4,911,594 * 3/1990 | Fisher . |
| 4,925,351 * 5/1990 | Fisher . |
| 5,324,147 * 6/1994 | Leon . |
| 5,382,124 * 1/1995 | Frattarola . |
| 5,395,194   3/1995 | Johnson et al. . |
| 5,673,920  10/1997 | Mockenhaupt . |
| 5,707,192 * 1/1998 | Vortriede . |
| 5,779,411 * 7/1998 | Vasseur . |
| 5,807,052   9/1998 | Van Boven et al. . |

* cited by examiner

*Primary Examiner*—Flemming Saether
(74) *Attorney, Agent, or Firm*—John A. Fortkort; Alan Ball

(57) ABSTRACT

A threaded fastener retention device includes a housing having a retainer aperture formed therein and tab retainers adjacent the aperture. A resilient retainer is movably mounted in the aperture. The retainer includes a body having tabs for engaging the tab retainers and fastener gripping members for engaging the threads of the fastener and retaining the fastener in the housing.

2 Claims, 5 Drawing Sheets

MOVABLE RETENTION DEVICE FOR A THREADED FASTENER

This application is a regular application claiming priority from U.S. provisional application Ser. No. 60/099,240 filed Sep. 4, 1998.

BACKGROUND

The disclosures herein relate generally to fastener retainers and more particularly to a replaceable fastener device for retaining a threaded fastener which has been separated from a threaded receiver.

Threaded fasteners have many uses including the interconnection of parts such as cable housings and the like. One such housing is a fiber optic cable splice closure, including a cover member, and a base member, such as that disclosed in U.S. Pat. No. 4,805,979. In this application, bolts extend through the cover member and engage a threaded receiver in the base member in order to secure the cover to the base. When the cover is to be removed, the bolts are disengaged from their threaded receivers. Once disengaged, the bolts are subject to falling out of the cover. As a result, when the cover is to be re-attached to the base, one or more of the bolts may not be within reach and must be retrieved. This is especially difficult in the case of a pole mounted closure because the cover may be mounted several feet above the ground surface, making retrieval of the bolts both difficult and time consuming.

Many retainer devices have been developed for the purpose of retaining a bolt or other fastener device, when that device is disengaged from its respective threaded receiver. Some of these devices are not suitable for use in cable splice closures either because they are not sturdy and do not have a suitable life expectancy, or cannot withstand the effects of environmental elements, or in the event of failure, are not replaceable.

Therefore, what is needed is a fastener retention device which is sturdy enough to be reliable and have extended life expectancy, which is replaceable in the event of damage or failure, and which is suitable for use in an outdoor environment substantially unaffected by environmental elements.

SUMMARY

One embodiment accordingly, provides a replaceable fastening retainer for retaining a fastener in a housing, permitting the fastener to move axially within the retainer and permitting the fastener and retainer to move relative to the housing for alignment purposes. To this end, a fastener retention device includes a housing having a retainer aperture formed therein and tab retainers adjacent the aperture. A resilient retainer is movably mounted in the aperture. The retainer includes a body having fastener gripping members for engaging and retaining the fastener.

A principal advantage of this embodiment is that the retainer snaps into a retainer housing and is removable and replaceable. In addition, the retainer is sturdy and resistant to damage from environmental elements. Furthermore, the retainer engaged with a fastener in the retainer housing is movable within the housing to permit the fastener to be aligned with a fastener receiver.

BRIEF DESCRIPTION OF THE DRAWING FIGURES

DETAILED DESCRIPTION

Figure 1:
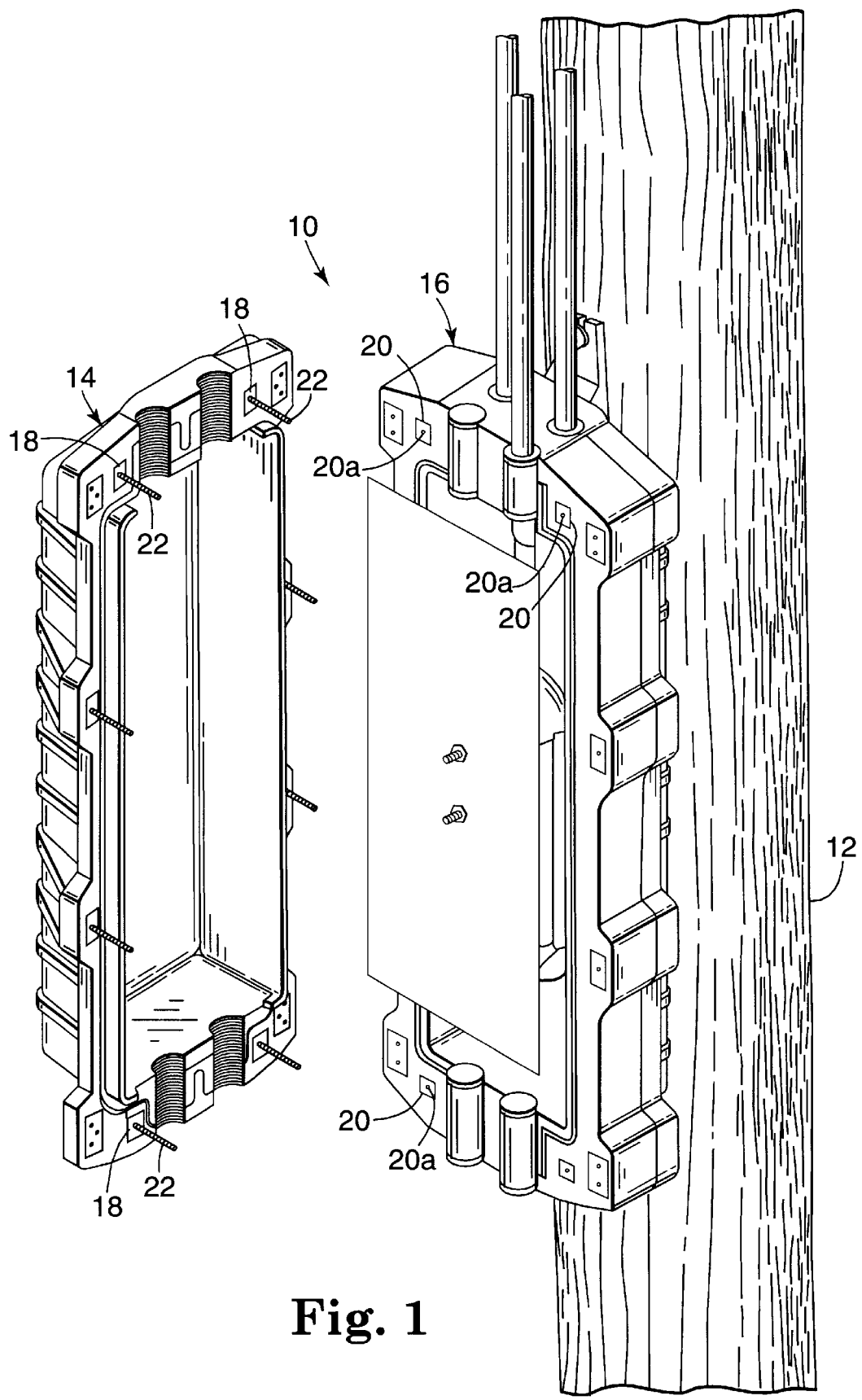
FIG. 1 is a perspective view of a known fiber optic cable splice closure assembly including a cover and a base.

A fiber optic cable splice closure 10, FIG. 1 is mounted on a pole 12, or may be in some instances, buried underground. Closure 10 includes a cover 14 illustrated as from a base 16. A plurality of bolt housings 18 are securely mounted in cover 14, and a plurality of threaded bolt receivers 20 are securely mounted in base 16. A plurality of bolts 22 extend through bolt housings 18 in cover 14. When cover 14 is engaged with base 16, bolts 22 are in substantial alignment with an aperture 20a in each bolt receiver 20. Thus, it can be appreciated that when bolts 22 are disengaged from receivers 20, and are loosely supported in housings 18, the bolts 22 can fall free of housings 18 unless retained therein.

Figure 2:
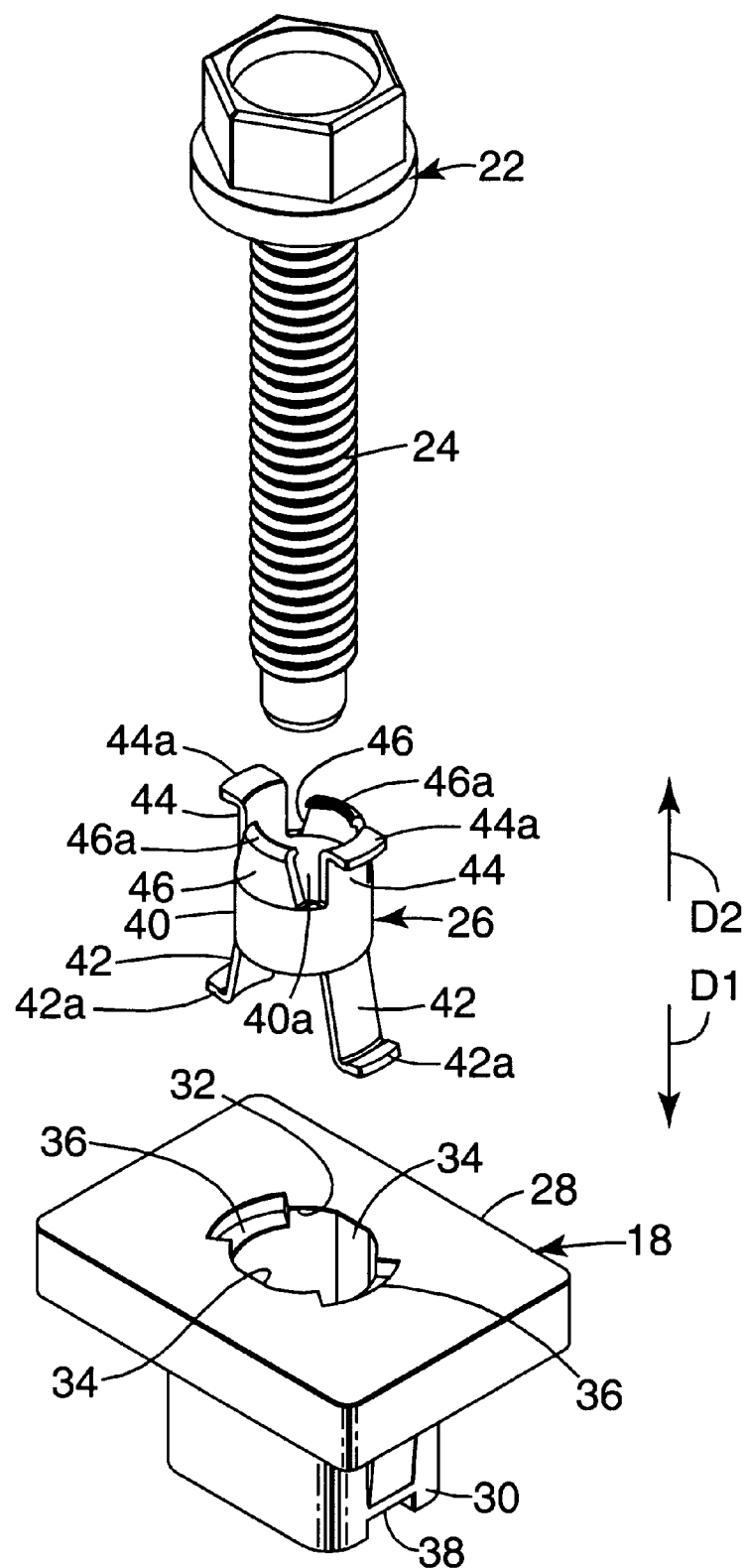
FIG. 2 is an exploded perspective view illustrating an embodiment of a bolt, a retainer and a retainer housing.

Each of the bolts 22, FIG. 2, including a plurality of threads 24 is engageable with its respective housing 18 and is retained therein by a resilient retainer 26. Housing 18 includes an enlarged head end 28 and a shank end 30. An aperture 32 is formed to extend through housing 18. Aperture 32 is substantially oval in cross-section including a pair of opposed flat surfaces 34. Head end 28 of housing 18 includes a pair of opposed tab retaining slots 36 adjacent aperture 32. Shank end 30 of housing 18 similarly includes a pair of opposed tab retaining slots 38 adjacent aperture 32, see also FIG. 3.

Resilient retainer member 26, FIG. 2, includes a generally cylindrical body portion 40 including a throughbore 40a. A first pair of opposed tabs 42 extend from body 40 in a first direction designated DI. Each tab 42 includes a tab flange 42a, each of which extends in outward opposite directions away from each other. A second pair of opposed tabs 44 extend from body 40 in a second direction designated D2, opposite the first direction D1. Each tab 44 also includes a tab flange 44a, each of which extends in outward opposite directions away from each other. In addition, a pair of opposed fastener gripper members 46 also extend from body 40 in the second direction D2. Each gripper member 46 includes a gripper flange 46a, each of which extends inwardly toward each other.

Figure 3:
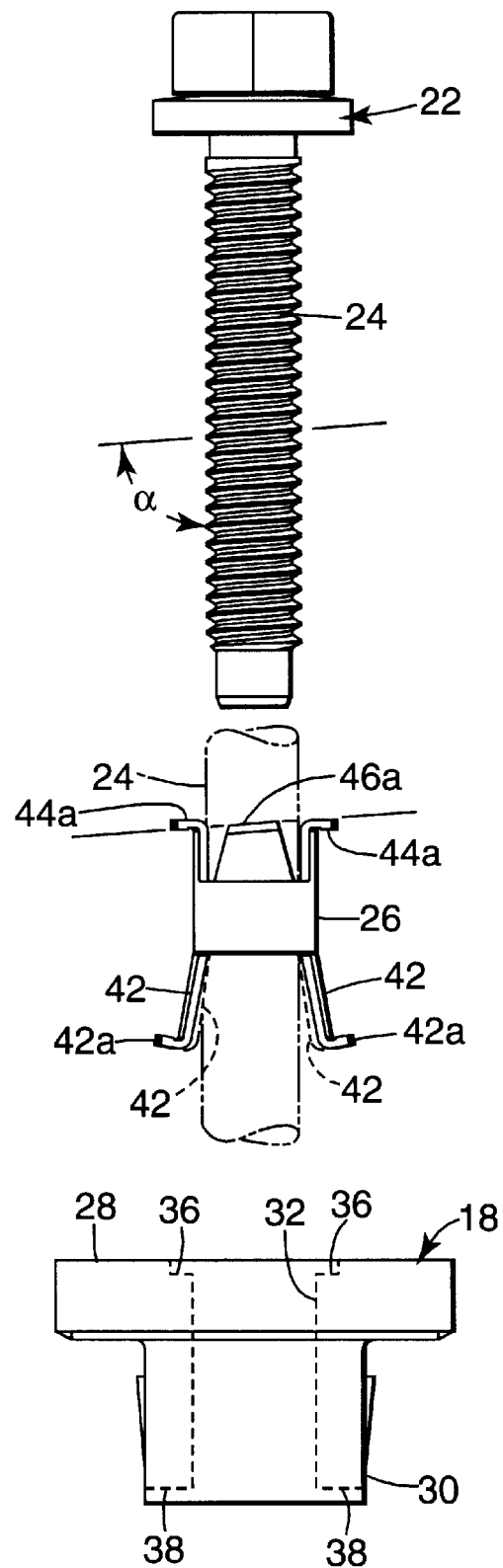
FIG. 3 is an exploded side view illustrating an embodiment of fastener gripper members disposed at the same angle as the threads.
Figure 4:
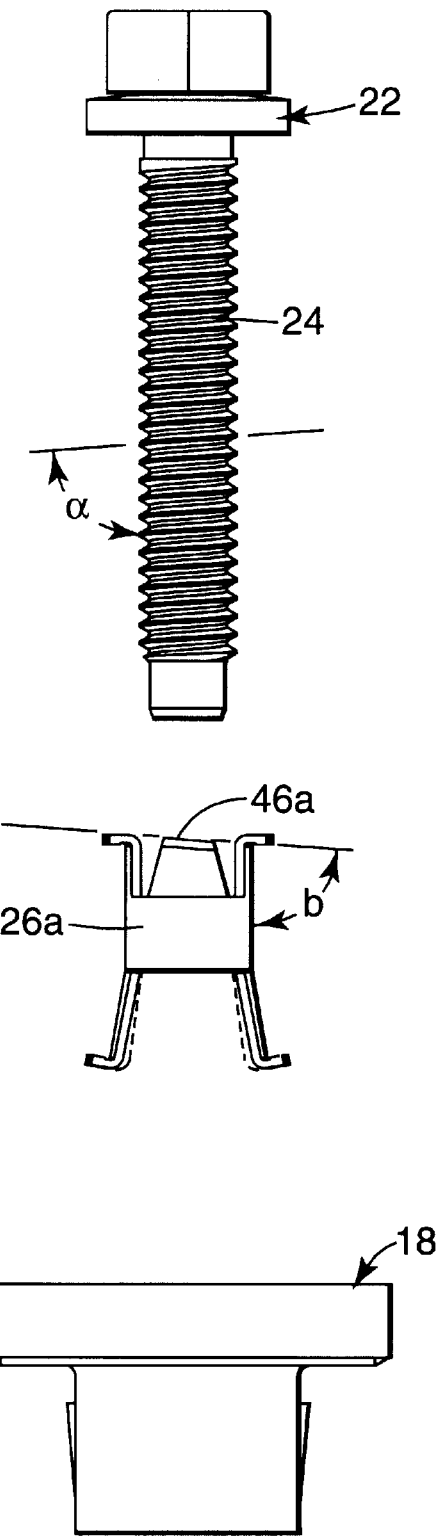
FIG. 4 is an exploded side view illustrating an embodiment of fastener gripper members disposed at an angle opposite to the thread angle.
Figure 5:
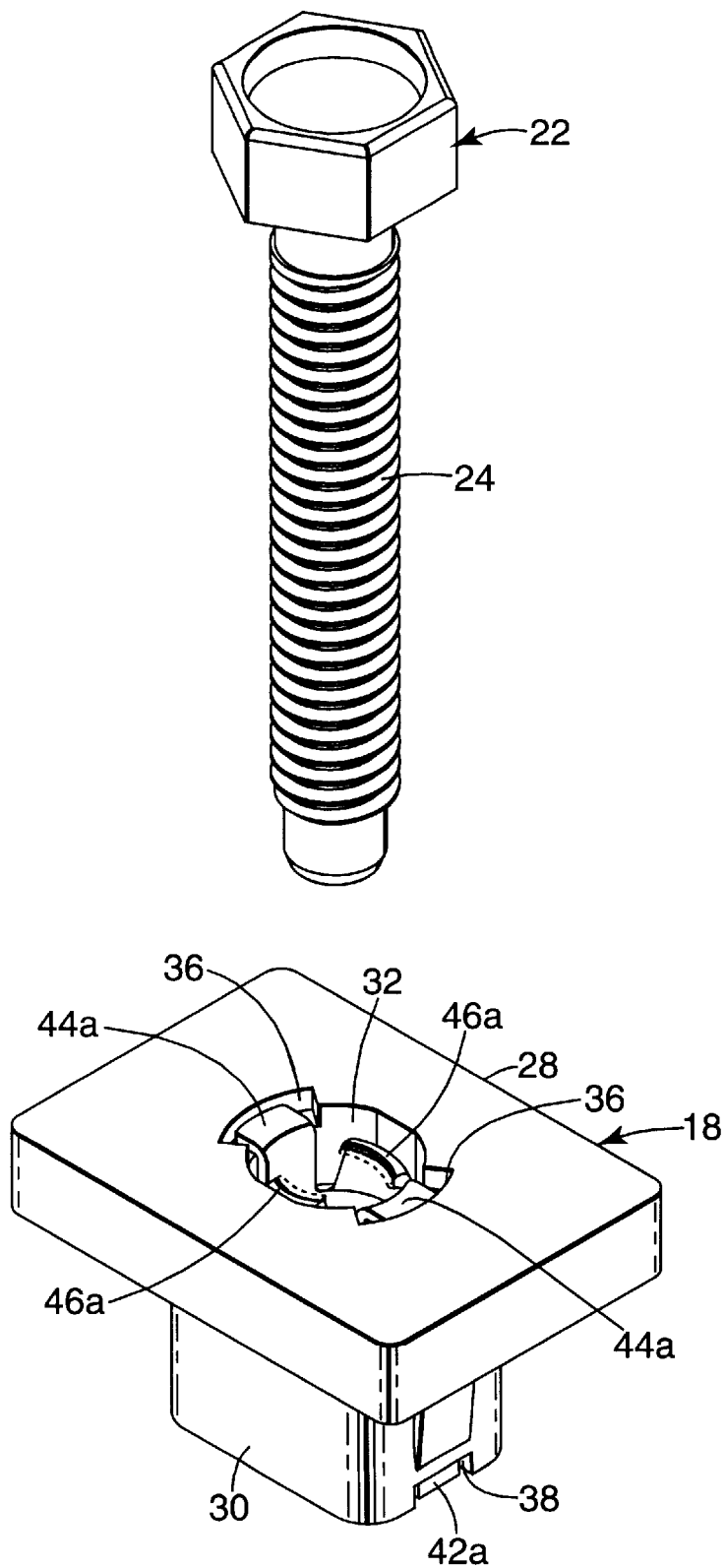
FIG. 5 is an exploded view illustrating an embodiment of the retainer mounted in the retainer housing.

In FIG. 3, bolt housing 18 includes the aperture 32, and the tab retaining slots 36 at head end 28 adjacent aperture 32. Bolt housing 18 also includes tab retaining slots 38 at shank end 30 adjacent aperture 32. It can be appreciated that insertion of resilient retainer member 26 in aperture 32 requires flexure of first opposed tabs 42 toward each other. When resilient retainer member 26 is seated in aperture 32, tab flanges 44a engage tab slots 36, and tab flanges 42a engage tab slots 38, see also FIG. 5. It can also be appreciated that gripper flange 46a, FIG. 3, of retainer 26, is disposed at an angle—which substantially matches alignment with angle  of threads 24 of bolt 22. In FIG. 4, however, it can be appreciated that gripper flange 46a of retainer 26a is disposed at an angle b, which is not aligned with angle  of threads 24 of bolt 22.

In operation, the resilient polymeric material construction of retainer 26 permits bolt threads 24 to be advanced by rotating the bolt 22 through the retainer bore 40a of retainer 26 due to engagement of opposed gripper flanges 46a with rotating threads 24. Alternatively bolt 22 may be axially inserted into the throughbore 40a of the resilient retainer 26 so that interference occurs as the plurality of threads 24 is forced across the opposed gripper flanges 46a. When gripper flanges 46a are angularly aligned with threads 24, as in FIG. 3, they become seated in the root formed by threads 24 of a threaded bolt 22. Thus positioned, there is less wear of the gripper flanges 46a and more movement of the engaged bolt 22 as it rotates through the throughbore 40a. When gripper flanges 46a are not angularly aligned with threads 24, FIG. 4, there is more wear of the gripper flanges 46a during axial insertion or rotation of a threaded bolt 22. Lack of angular alignment causes a cross-threaded condition of threads 24 and gripper flanges 46a. This hinders engagement of the gripper flanges 46a for rotation in the threads 24. If the gripper flanges 46a cannot follow the contours of the threads during rotation of the bolt 22 there will be less movement of the engaged bolt 24. In addition, it has been found that flexure of tabs 42 inwardly toward each other, FIG. 3, results in a flexure of gripper flanges 46a inwardly toward each other, FIG. 5, which provides a positive engagement between gripper flanges 46a and threads 24, when retainer 26 is mounted in housing 18, and bolt 22 is inserted into retainer 26. Furthermore, cylindrical body portion 40 is provided to be smaller than oval aperture 32 in one direction but engages the flat surfaces 34. As a result, retainer 26 is permitted movement in one direction within aperture 32, but is restrained by the flat surfaces 34 from movement in a direction transverse to the one direction. Thus, when bolt 22 is in retainer 26 within aperture 32, bolt 22 is conveniently movable for alignment with apertures 20a in bolt receivers 20 of base 16, FIG. 1.

As a result, one embodiment provides a fastener retention device, including a housing having a retainer aperture formed therein and tab retainers adjacent the aperture. A resilient retainer is movably mounted in the aperture and includes a body having tabs for engaging the tab retainers, and having fastener gripping members for engaging and retaining the fastener. The aperture may include a pair of opposed flat sides for engaging the retainer.

In another embodiment, the fastener may include threads which are gripped by the fastener gripping members. The threads may be disposed at an angle and the gripping members may be disposed at the angle of the threads. In a further embodiment however, the threads may be disposed at a first angle and the gripping members may be disposed at a second angle, different from the first angle. In addition, flexure of an opposed pair of the tabs, toward each other, results in flexure of the gripper members toward each other.

As it can be seen, the principal advantage of these embodiments are they provide a replaceable resilient retainer to retain a threaded fastener while still permitting the fastener to move freely up and down in the retainer bore. The retainer is made from a polymeric resilient material with the bore extending therethrough to receive the fastener. The retainer has four tabs used to lock the retainer into a housing while still permitting the bolt and the retainer to float freely for alignment purposes. This device has the advantage of holding a fastener so it does not fall out of the bore while still permitting the fastener to move freely up and down in the bore. The retainer does this with resilient gripper features that go down into the root of the thread of the fastener. The retainer is designed to be in a substantially relaxed state while installed and only when it is moved up and down will the plastic see some strain. The retainer can be used in many different places where fastener movement is required while still retaining the fastener.

The bolt retention device is installed in a housing including gripping features that lock the bolt in position. The tabs, (4) are shown, display their intended purpose to lock the retention device into the housing tab reliefs. The two outwardly angled tabs on the retainer, compress inward to the installed position and produce movement of the gripping features towards the bolt to provide more pressure on the bolt threads. There are various ways of retaining the bolt. In one, the locking angle is opposite the thread angle and in the other, the locking angle is the same as the thread angle. The benefit to the one is that there will be less movement of the bolt vertically. The benefit to the other is that there is less wear on the gripper flanges and a more positive lock is provided.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A fastener retention device for gripping threads of a threaded fastener comprising:

an elongate tubular housing having a first end opposite a second end and having an aperture formed in the housing to open to the first end and the second end, the tubular housing having indented tab retainers adjacent to the first end and recessed tab retainers adjacent to the second end;

a resilient retainer including a wall defining a generally cylindrical body that separates first tabs from second tabs, the elongate tubular housing surrounding the cylindrical body that is movably mounted in the aperture between the first end and the second end, the first tabs being positioned in the indented tab retainers and the second tabs seated in the recessed tab retainers; and at least a pair of grippers, integral with the wall between the first and second ends of the elongate housing, the grippers adapted to engage threads of a threaded fastener whereby the fastener retention device permits axial and rotational movement of a fastener removably inserted therein.

2. The device as defined in claim 1 wherein the aperture includes a pair of opposed flat sides.

* * * * *